Jan. 8, 1963 H. LANDIS 3,072,085
METHOD AND APPARATUS FOR PRODUCING HOLLOW ARTICLES
Filed May 8, 1959 2 Sheets-Sheet 1

INVENTOR.
Harvey Landis.
BY
Wood, Herron & Evans.
ATTORNEYS.

INVENTOR.
Harvey Landis.
BY
Wood, Herron & Evans.
ATTORNEYS.

United States Patent Office 3,072,085
Patented Jan. 8, 1963

3,072,085
METHOD AND APPARATUS FOR PRODUCING HOLLOW ARTICLES
Harvey Landis, Cincinnati, Ohio, assignor to American Radiator & Standard Sanitary Corporation, New York, N.Y., a corporation of Delaware
Filed May 8, 1959, Ser. No. 811,941
4 Claims. (Cl. 113—44)

This invention is an improvement over that disclosed in Garvin U.S. patent application Serial No. 480,364, now issued as U.S. Patent 2,902,962 and relates to a method and machine for producing diverse hollow articles of regular or irregular shape from metal tubing. The present invention differs from the aforesaid Garvin invention in that the feed of metal of the work piece into the mold cavity, rather than the application of pressure to the interior of the work piece sufficient to bulge the same, constitutes the primary force factor by which the metal of the work piece is caused to assume the contour of the mold cavity.

Briefly, and paradoxically, this invention is predicated upon the discovery and determination that a tubular work blank may be caused to assume the contour of a mold cavity by feeding the metal of the work piece into the mold cavity, for example by movement in a direction axially of the work piece, while the work piece is being stressed or supported but not deformed by internally applied hydraulic pressure.

More specifically, the invention is based upon the discovery and determination that a tubular work blank may be expanded in shape, as measured by the circumference or cross-sectional area, to a degree far greater than it is possible to obtain by application of internal bulging pressure, by initially stressing the work piece beyond its initial yield point to render the metal plastically deformable, and thereafter feeding the tube into the mold cavity while maintaining a pressure within the tube which in and of itself is inadequate to perform further bulging function.

The invention is based upon the further discovery and determination that large expansion of the work piece can be achieved in this manner with no significant reduction in wall thickness of the work blank and, thus, without the loss of wall strength which inherently accompanies an expansion produced in whole or in part by application of internal pressure only.

In substance, the method of the present invention may be characterized as one wherein substantial expansive change of shape is produced essentially by feed of metal into a mold cavity while the metal is under internal pressure sufficient to urge the metal outwardly but is not actually bulged thereby. I have found that metal fed physically into a mold cavity by mechanical force after the initial yield point of the metal has been passed will follow along the contour of the mold cavity even though the pressure at the interior of the work piece during feeding is incapable of actually bulging the metal at least to any useful or significant degree.

In order to understand the present invention, it should be noted that a work piece in its original or undeformed state will begin to bulge to some degree upon application of some predetermined pressure to the interior thereof; in this condition the metal is stressed beyond its elastic limit and the metal will flow or begin to flow. Throughout this specification such pressure is termed the initial yield point pressure. Once having been bulged to some degree, a higher internal pressure is required to be applied before further bulging will occur. Thus, the yield point pressure becomes increasingly higher once the initial yield point pressure has been exceeded, other conditions being equal. In accordance with this invention, a work piece seated within a mold cavity is subjected to internal pressure just exceeding the initial yield point pressure of the work piece such as to initiate plastic deformation of the work piece. Once having initiated plastic deformation of the work piece, further deformation of the work piece is then accomplished by mechanical feeding rather than by further application of internal pressure sufficient to continue to bulge the metal in accordance with past methods. Otherwise expressed, in accordance with this invention pressure is employed only to start the plastic flow of the metal and is not thereafter employed to bulge the metal; feeding of the metal after application of the initial yield point pressure results in shaping of the metal in the mold.

As will be understood by those skilled in the art, a work piece to be shaped by hydraulic means must be sustained in a die providing the appropriate cavity conforming to the ultimate shape which is to be produced. The die is preferably made up of separable sections to facilitate introduction of a tubular work blank and to facilitate removal of a finished piece after shaping. Means is also conventionally employed to close or form seals with the ends of the work piece so as to retain hydraulic fluid under pressure therein and initially to purge the work piece of air entrained therein which, being compressible, would otherwise interfere with the operation and fill the work piece with hydraulic fluid.

Various means may be employed to provide controlled pressure approximating the yield point pressure of the work piece to the interior thereof prior to and during feeding of the work piece, and various means may be employed to feed the work piece into the mold cavity to effect the shaping of the contour thereof into conformity with the cavity shape. Since many of the functions shown in the aforesaid Garvin U.S. Patent 2,902,962, such as mold closing and opening, sealing of the ends of the work piece, purging of air from the work piece, and filling the same with fluid, as well as automatic sequencing of such events desirably may be employed in conjunction with the present invention, the present invention conveniently is disclosed generally in relation to the aforesaid Garvin patent, but, to avoid needless repetition, the features thereof which form no part of the present invention are not described specifically in detail herein.

In the drawings forming part of the present specification:

Figure 1:
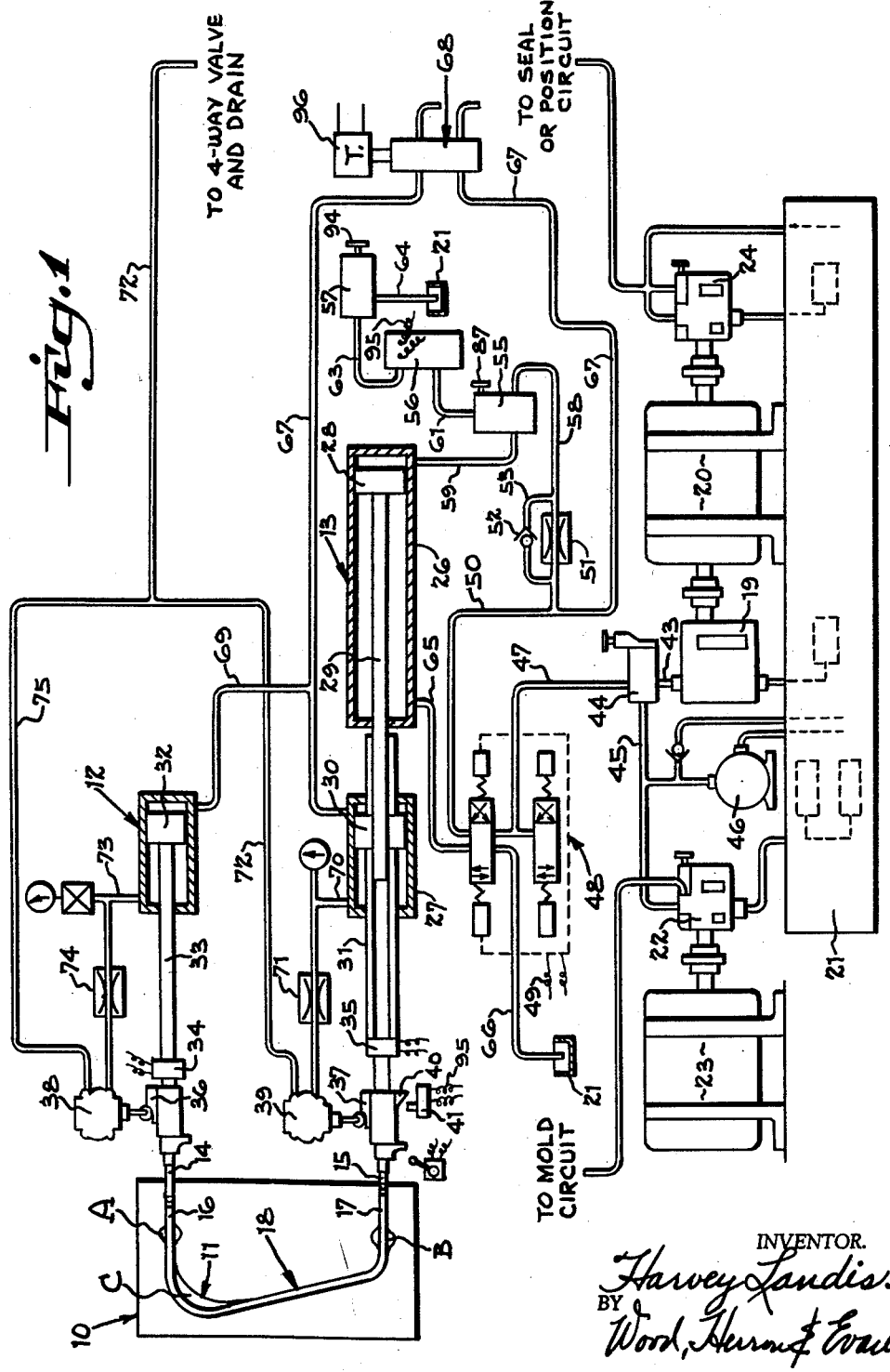
FIGURE 1 is a diagrammatic view generally similar to FIGURE 1 of the aforesaid Garvin patent but differing therefrom as to the hydraulic circuitry concerning pressure control and work feeding functions as subsequently explained.

The main mechanical elements of the embodiment of the present invention shown in the drawings comprise a die indicated generally at 10 provided with a cavity 11 configurated to the shape to which a work piece ultimately is to conform and power cylinder assemblies respectively indicated generally at 12 and 13. The pistons of the power cylinder assemblies terminate in tapered endwise sealing members 14 and 15 adapted for engagement in the respective endwise portions 16 and 17 of a work piece blank seated in the die 10, as indicated generally at 18.

Hydraulic fluid for performing the shaping operations according to the method of the present invention is supplied, through circuitry subsequently explained, from a pump 19 which is driven by a motor 20 and which surmounts a tank or reservoir 21. Pump 19 is selected to provide as high a pressure as may be required to be employed in the processing of the various types of work pieces which can be accommodated in the apparatus. For example, in the shaping of brass and copper work blanks up to aproximately 1½" or more in size and having a wall thickness of up to approximately .095" or more, a pump operating at a maximum pressure of approximately 2,000 pounds is adequate both to supply the initial yield point pressure preceding feed-forming in accordance with the present invention and for application of such coining pressure as may subsequently be desirable.

By way of illustration, the cavity of die 10 is shown as one conforming to the shape of a faucet spout to be produced from a plain tubular blank 18 bent to a U shape which will be expanded to display bulbous formations A and B adjacent the endwise portions 16 and 17 and an enlarged neck portion C at one end of the bends of the U. These deformations are to be accomplished with minimum reduction of wall thickness of the metal of the tube. In the embodiment disclosed by way of example, the tube may be of brass approximately ⅞" in outside diameter with a wall thickness of .049", but it is to be understood that tubes made of copper or other alloys, both ferrous and non-ferrous and of substantially differing dimensions and wall thickness, may be expanded readily by means of the present improvement.

It will be understood that the die 10 may comprise separable sections movable toward and from one another to receive and hold a work piece therebetween and that a hydraulic piston and cylinder arrangement (not shown herein but which may be of the type shown in the aforesaid Garvin patent) may be used to actuate the movable die member to facilitate production. The hydraulic fluid required for such purposes may be supplied from a separate pump 22 driven by a motor 23. It will also be understood that presentation of the sealing nozzles 14 and 15 to the work piece and removal therefrom, as well as purging of the work piece to remove air otherwise trapped therein, may be accomplished readily in the manner disclosed in the aforesaid Garvin patent by means of separate hydraulic circuitry not shown herein supplied from a pump 24 which may be driven by the main pump motor 20.

The power motor indicated generally at 13 comprises a pressure cylinder 26 and a feeding cylinder 27. Pressure cylinder 26 has a piston 28 for driving piston rod 29 thereof, while feeding cylinder 27 has a piston 30 driving a piston rod 31. The cylinders 26 and 27 are arranged in tandem, and the piston rod 30 is hollow and is telescopically engaged by piston rod 29 of the cylinder 26, whereby a compounding pressure effect is obtained within cylinder 30 according to the difference of cross-sectional area between piston 28 and piston rod 29. In a typical construction, by way of example, the area of piston 28 may be approximately thirty times the area of piston rod 29 which constitutes the piston of plunger 30 whereby pressure discharged from the endwise portion of the plunger 30 will be approximately thirty times greater than any given pressure applied to the head end of cylinder 26.

Power motor 12 may be of similar construction, but, for many purposes, a feeding function is required at only one end of a work piece. Therefore, in the embodiment shown power cylinder 12 merely comprises a single piston 32 driving a piston rod 33. Piston rod 33, like piston rod 30, is hollow, and the tapered, work-engaging members 14 and 15 of the respective piston rods have bores therein communicating with the bores in the piston rods for passage of fluid therethrough to or from the interior of the work piece. Piston rods 31 and 33 respectively are provided with check valves 34 and 35 by means of which liquid may be introduced into and through the work piece after the seal members 14 and 15 have been seated at the ends thereof whereby the interior of the work piece may be scavenged and then left completely filled with fluid as described in the Garvin patent. When the scavenging and filling have been completed, the check valves 34 and 35 of course are closed.

Spaced inwardly from the ends 14 and 15 of the piston rods 31 and, 33 the rods carry cam members 36 and 37 which are positioned to actuate valve members 38 and 39 as subsequently explained. In accordance with the present invention, piston rod 31 also includes dog 40 which is positioned to actuate an electrical limit switch 41 as subsequently explained.

In the hydraulic circuit, pump 19 discharges through line 43 to a primary pressure relief valve 44 which, in event of blockage of the system for any reason, is actuated to discharge the output of the pump back to tank 21 through a line 45 as is conventional in circuits of this type. The discharge line may include an oil cooler 46.

From the pressure relief valve 44 fluid normally is directed through line 47 to a four-way directional control valve indicated generally at 48. This is a solenoid operated valve which, as fully explained in the aforesaid Garvin patent, is controlled electrically to govern the movement of pistons 28 and 32 in their respective power cylinders. The electrical leads to the solenoids of the valve are indicated diagrammatically at 49 and, upon appropriate energization, it may be assumed for present purposes that the valve is opened to direct flow through a line 50 which includes an adjustable flow control or metering valve 51. A check valve 52 is arranged in a by-pass 53 around flow control valve 51, the check valve being so positioned as to permit the passage of fluid through the by-pass line only in a direction toward the pump 19.

In accordance with the present invention, fluid is to be admitted to the head end of the piston in cylinder 26 such that a pressure conforming to the initial yield point pressure characteristic of a given work piece to be shaped may be delivered to the interior of the work piece through the seal member 15 after which, and while such pressure is maintained, a pressure is to be applied to the head end of piston 30 in feed cylinder 27 sufficient to advance the plunger and thereby feed the work piece into engagement with the mold cavity. These sequential operations perform the main forming functions, at the completion of which the wall of the tube is fully or substantially in engagement with the wall of the die cavity depending upon cavity shape. Thereafter, at least in cases where the die cavity presents sharp corners or small details which are to be reproduced in the finished piece, it may be desirable to exert a very high pressure within the work piece such that it will be "coined" against the die cavity while being sustained thereby.

To assist in accomplishing these respective functions in an automatic way, three valves are employed in the embodiment disclosed. These comprise a pressure control valve 55, a solenoid controlled shut-off valve 56, and a pressure relief valve 57. Fluid, as metered in quantity through valve 51, is delivered to the inlet side of valve 55 through line 58, and the main outlet port of valve 55 is connected to the head end of cylinder 26 through line 59. A vent outlet 60 (FIGS. 2, 3) of valve 55 is connected to the inlet side of solenoid valve 56 through line 61. The outlet 62 (FIGS. 2, 3) of valve 56 is connected to the inlet of valve 57 through line 63, and the outlet of valve 57 is connected to the reservoir 21 through line 64.

The manner in which valves 55, 56, and 57 are constructed and cooperate with one another is described in detail at a later point in the specification. For the moment, it is appropriate to note that fluid under pressure, as controlled by the functioning of valves 55, 56, and 57, may be applied through line 59 to the head end of piston 28 in cylinder 26 whereby fluid at compounded pressure is applied through the seat member 15 to the interior of the work piece. To accommodate forward movement of piston 26, fluid normally contained at the rod side of the piston in cylinder 26, as shown in the Garvin patent, is permitted to discharge therefrom through line 65 which is connected to directional control valve 48; the fluid discharge is returned from the valve to the reservoir 21 as indicated by line 66.

For feeding purposes a line 67, connected to the line 50 leading from the directional control valve 48, is taken to the head end of piston 30 in feed cylinder 27, but line 67 passes through a directional control valve indicated generally at 68 which may be a four-way directional control valve the same as valve 48. A line 69 branching from line 67 at a point beyond valve 68 similarly is connected to the cylinder 12 at the head end of the piston therein so that pistons 30 and 32 are under the same pressure at the same time.

The rod side of feed cylinder 27 is equipped with a line 70 which leads through a flow-restricting or metering valve 71 to a shut-off valve 39, the return line from which 72 leads to the reservoir 21 through a four-way valve as shown fully in the aforesaid Garvin patent. Similarly, line 73 connected to the rod side of cylinder 12 leads through a flow-restricting or metering valve 74 which, in turn, is connected to a shut-off valve 38, and the other side of valve 38 is connected to line 72 through line 75.

Assuming that the seats 14 and 15 are engaged against the endwise portion of a work piece held within the die, it will be seen that when pressure is admitted to the head end of piston 30 in the feed cylinder 27, the piston will advance independently of piston rod 29 therein and will push the work piece into the die. If the metal of the tube is fed into the die by means of the feed cylinders while a pressure merely conforming to the initial yield point pressure is maintained in the work piece, the work piece will assume the contour of the die cavity. However, lunging or too rapid feed movement of the piston in feed cylinder 27, which might otherwise occur to cause buckling or imperfect forming of the work piece if piston 30 were unrestricted is prevented because valve 71 exerts a back pressure upon the forming piston and thereby permits it to move forward at a slow rate controlled by the degree of restriction provided in valve 71.

As feed movement continues, the cam 37 comes into engagement with the follower on valve 39, thereby actuating valve 39 to closed position when the desired amount of feed of metal into the die has taken place. This closure of line 72 immobilizes piston 30. The same is true as to valve 38 which is responsive to the movement of rod 33 of cylinder 12.

In order to understand the manner in which initial yield point pressure in the cylinder is controlled during form-feeding, it is appropriate next to refer to valves 55, 56, and 57 in detail.

Figure 2:
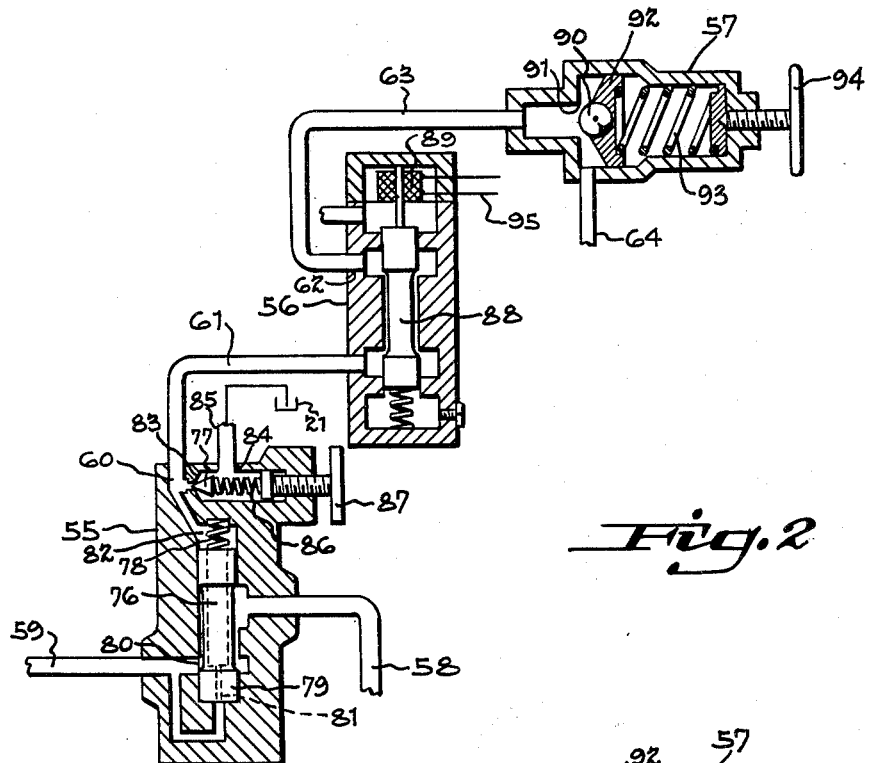
FIGURE 2 is a cross-sectional view showing the internal construction of hydraulic circuit control elements including a valve facilitating utilization of the method of this invention.
Figure 3:
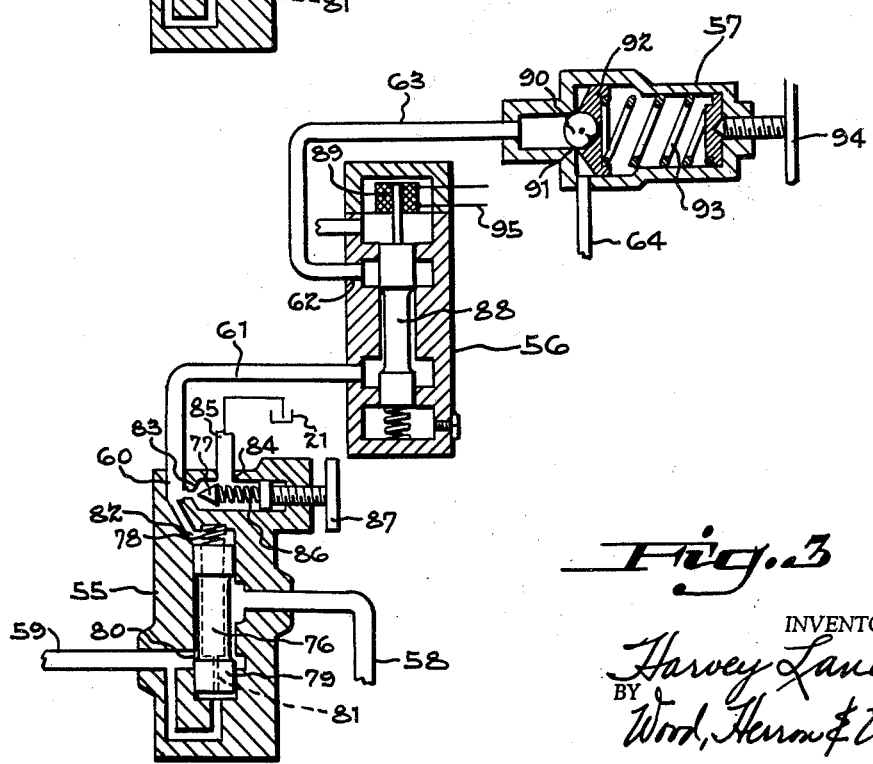
FIGURE 3 is a section view similar to FIGURE 2 showing the relationship of the parts under a different stage of operation.

Valve 55, which may be a pressure reducing valve of the type commonly used for limiting pressure in a branch line, such as Vickers, Inc. Number XCT-06-F, comprises a first valve element in the form of a spool 76 and a second valve element in the form of a poppet 77. The spool 76 is biased downwardly by a compression spring 78 and has an enlarged endwise portion 79 which, by vertical spool position, determines the size of port opening 80. When the valve is in the open position as shown in FIGURE 2, the inlet is in communication with the outlet through a passageway provided by spool clearance adjacent the spool head 79. The spool has a restricted longitudinal bore 81 extending through it into communication with an upper chamber 82 which communicates with outlet 60 to which line 61 is connected. The outlet 60 of the valve is also in communication with the poppet through a passage 83.

The poppet valve element 77 normally closes a port 84 which leads to a drain or drip opening 85, which may be returned to reservoir 21. The poppet valve is urged to closed position by a compression spring 86 which is adjustably controllable by hand wheel 87. Normally the poppet valve is completely inactive while the form-feeding operation is in progress, but the setting of the hand wheel 87 determines the coining pressure which subsequently may be exerted upon the work piece.

Solenoid valve 56 is of conventional type comprising a spool 88 which is movable downwardly by means of solenoid 89 against a compression spring such that the valve normally is open when the solenoid is de-energized and closed when the solenoid is energized. Thus, in the valve shown in FIGURE 2 fluid passing through valve 55 passes from line 61 to 62 through the spool clearance passageway and out valve 56 through line 63.

Valve 57 is a conventional poppet type pressure relief valve comprising a ball 90 cooperable with a seat 91 and carried on a guide 92 which is under the bias of a compression spring 93. A hand wheel 94 enables compression of the spring to be adjusted, thereby enabling adjustment of the pressure in line 63 which will be effective to cause the valve element 90 to be unseated.

Assuming that the work piece has an initial yield point pressure 6,000 p.s.i.g. and that a compounding effect of thirty times is provided through power cylinders 26 and 27, valve 57 is set to open at a pressure of approximately 200 p.s.i.g.

Under these conditions, it will be seen that pressure fluid entering valve 55 through line 58 will pass through the port 80 thereof, thence enter the head end of cylinder 26 through line 59. Since the restricted passageway through the spool connects the chambers at each end thereof, fluid pressure at the outlet port is present at both ends of the spool, and the spool is hydraulically balanced; the only effective pressure on it is the downward thrust of the spring 78 which thereby tends to maintain the opening 80 at its maximum size. During this phase of operation in which pressure is being built up in cylinder 26, valve 57 remains closed. Pressure now accumulates in lines 61 and 63 sufficiently to unseat ball 90 of valve 57 whereby the flow from the pump as metered through valve 51 is returned to the reservoir. This condition corresponds to one in which the initial yield point pressure is established and controlled within the work piece.

During this phase of the operation, as previously described, line 67 is closed at valve 68. However, valve 68, either electrically, mechanically or in any suitable manner, is now moved to open position. Thus, while initial yield point pressure is maintained within the work piece, unreduced pressure is applied to the feed cylinder 27, causing the piston thereof to advance the work piece into the mold.

As the work piece advances into the mold and follows the cavity thereof, the internal volume of the work piece may increase disproportionately to its decrease in length. If piston 28 were immobilized, such increase of volume in the work piece might result in a decrease of the internal pressure within the work piece, and it would no longer conform to the desired pressure. However, such a pressure drop is prevented since any fall-off of pressure at the end of piston rod 29 in cylinder 30 permits the piston 28 to move forwardly, resulting in a decrease of pressure in line 59 and such pressure decrease is restored from line 58 through valve 55. In actual operation the pressure equilibrium is substantially constant.

As feed cylinder 30 moves forwardly into the die cavity, cam 40 moves into engagement with and actuates limit switch 41. The limit switch, as previously explained, is in circuit-controlling connection with the solenoid 89 in valve 56 as through electric leads 95 and a suitable power source 96. Therefore, when the contacts of the limit switch 41 are closed, the solenoid 89 is energized, closing valve 56 to block all flow through line 61. When this event occurs, the pressure of line 58 is applied to cylinder 26 through line 59 through valve 55 until a pressure is built up in chamber 82 sufficient to unseat poppet 77. The hand wheel 87 controlling the poppet is set to permit the poppet to be unseated at the maximum coining pressure which is desired. This, of course, may vary widely depending on the type of material being worked, its thickness, and the contour or character of the mold surface which is to be reproduced.

It is to be understood that valves 55, 56, and 57 are independent of valve 48 or other elements of the electro-hydraulic system for controlling seating of the seal members 14 and 15, purging of the work piece, or filling of the work piece as disclosed in the Garvin patent, and therefore may be operated with other types of apparatus for performing those functions. It is also to be noted that the sequential application of high pressure to the feed cylinder, as through the opening and closing of valve 68, readily may be controlled manually, or by an automatic sequence system as shown in the Garvin patent, or by means of a simple timer as is disclosed diagrammatically in FIGURE 1. For instance, the time required to build up initial yield point pressure within a work piece of given size or volume readily may be determined, and an electric timer 96 may be set automatically to open valve 68 after elapse of the short time required to build up the desired pressure in the given work piece. Also, it may be seen that a valve 55 of the shuttle type is not essential to the feed forming operation and that valve 55 for such purposes may be replaced by a valve of the type as valve 57 but that a shuttle type valve 55 is shown herein as a desirable feature of the apparatus since it permits convenient application and control of coining pressure after the feed forming operation has been completed.

The present invention permits substantially greater expansive deformation of a tubular blank consistently to be obtained on a production basis than can be obtained by conjoint application of bulging pressure and feed to a work piece of the same material, size, and shape. For example, expansions up to 130% of initial volume consistently have been obtained with a reduction of wall thickness of only 20% of original wall thickness, whereas greater reduction of wall thickness has resulted from expansions only 30% larger than original work piece size as produced by prior methods. The reasons fully explaining this unusual degree of response of the metal are not fully understood, but one explanation of the substantial improvement in result may reside in the fact that as tubular metal is stretched in a typical method wherein the metal is bulged by internal pressure, its strength decreases to the point where the tube bursts, whereas the infeed of metal according to the present invention involves no significant stretching or stress from internally applied force except such as is well below the bursting point. Thus, the pressure internally applied during feed-forming is effective merely to support the work piece against inward collapse which otherwise might uncontrollably occur, even at a slow feed rate.

Having described my invention, I claim:

1. Apparatus for expanding a tubular metal workpiece within a die having therein a cavity conforming to the shape to which said workpiece is to be expanded and adapted to receive said workpiece, said apparatus comprising means for filling said workpiece with hydraulic fluid when it is seated in said die and for sealing the fluid therein, said means including at least one nozzle adapted for sealing engagement with an endwise portion of said workpiece, a power cylinder for operating said nozzle, said nozzle having a ductway communicating with the interior of said workpiece and being effective when moved by said power cylinder to push said workpiece into said die while pressure is being applied to the interior of said workpiece through said ductway, a source of pressure fluid at a pressure substantially greater than the yield point pressure of said workpiece, first pressure control means in connection with said source for exerting and maintaining in said workpiece through said ductway a pressure sufficient to overcome the initial yield point pressure of said workpiece but insufficient to substantially bulge the workpiece, second control means in conection with said source of pressure and operable while said pressure is being maintained in said workpiece for applying to said power cylinder a pressure sufficiently high to move said nozzle and thereby force said workpiece endwisely into said cavity, whereby said workpiece assumes substantially the contour of said die cavity as a consequence of being fed into the same, and means including a control element responsive to the movement of the nozzle for decommissioning said first pressure control means and causing a pressure to be applied to the interior of said workpiece from said pressure source sufficiently high to coin the said workpiece against the surfaces of said die after said nozzle has fed the workpiece into said die.

2. The method of expanding a tubular work piece to predetermined shape which method comprises, inserting the tubular workpiece in a mold having a cavity of the predetermined shape to which the work piece is to be expanded and holding the work piece therein, filling the work piece with hydraullic fluid, exerting upon said hydraulic fluid in said work piece a pressure just sufficient to commence to bulge said work piece but insufficient to substantially bulge the same and then, while maintaining the said pressure within said workpiece, feeding the work piece into the mold whereby the metal of the work piece flows into engagement with the walls of said cavity, subjecting the workpiece upon completion of the said feeding operation to internal pressure substantially beyond the yield point pressure of the work piece and sufficient to coin the exterior of the work piece against the walls of said cavity while the work piece is being supported thereby.

3. Apparatus for expanding a tubular work piece to a predetermined shape, comprising a die adapted to receive said work piece and having therein a cavity conforming to said predetermined shape, pressure means including a pressure control valve for applying to the interior of said tubular work piece seated in said die a controlled, substantially uniform pressure just exceeding the initial yield point pressure of said work piece, such that the work piece will be at the threshold of becoming bulged thereby but will not actually be substantially bulged thereby, means for pushing said work piece inwardly toward and into said cavity from at least one endwise portion thereof while said pressure is being maintained at the interior of said work piece, and pressure means operable when activated to override said pressure control valve for ultimately exerting upon the interior of said work piece a pressure substantially greater than said initial yield point pressure as determined by said presure control valve and sufficiently high to coin said work piece against the surfaces of said cavity after said work piece has been expanded by the said infeed thereof.

4. Apparatus for expanding a tubular work piece to a predetermined shape, comprising a die adapted to receive said work piece and having therein a cavity conforming to said predetermined shape, pressure means including a pressure control valve for applying to the interior of said tubular work piece seated in said die a controlled, substantially uniform pressure just exceeding the initial yield point pressure of said work piece, such that the work piece will be at the threshold of becoming bulged thereby but will not actually be substantially bulged thereby, means for pushing said work piece inwardly toward and into said cavity from at least one endwise portion thereof while said pressure is being maintained at the interior of said work piece, and normally inactive pressure means operable when activated to override said pressure control valve for ultimately exerting upon the interior of said work piece a pressure substantially greater than said initial yield point pressure and sufficiently high to coin said work piece against the surfaces of said cavity after said work piece has been expanded by the said infeed thereof, and means for rendering active said normally inactive means.

References Cited in the file of this patent

UNITED STATES PATENTS 2,902,962     Garvin _____ Sept. 8, 1959

FOREIGN PATENTS 779,465     Great Britain _____ July 24, 1957